Jan. 3, 1967 H. WÄLISCHMILLER 3,295,389
APPARATUS FOR TRANSMITTING MOTION FROM A SAFE
AREA TO A DANGEROUS AREA
Filed April 29, 1963 2 Sheets-Sheet 1

INVENTOR.
Hans Wälischmiller
BY Michael S. Striker
Attorney

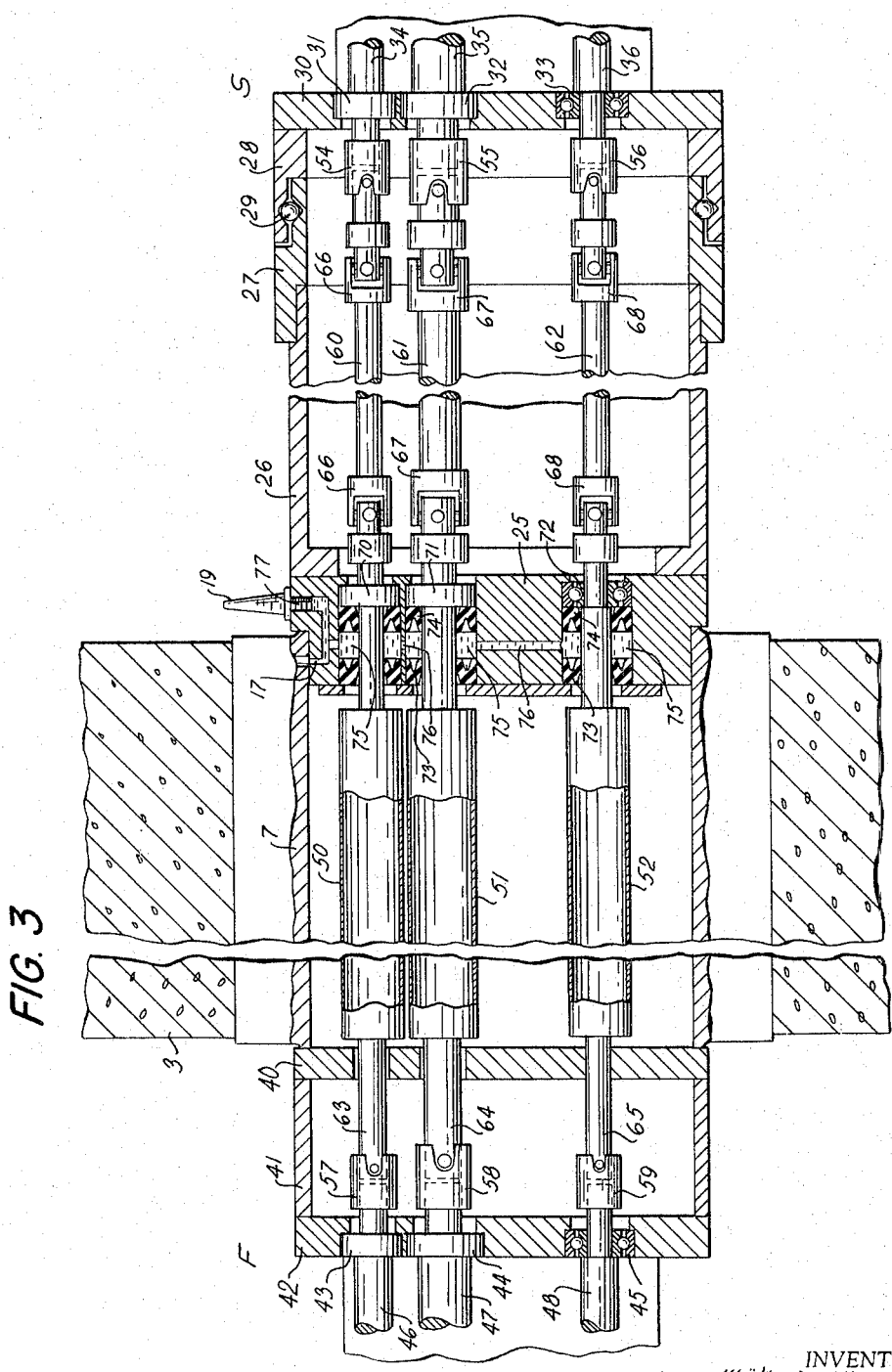

United States Patent Office 3,295,389
Patented Jan. 3, 1967

3,295,389
APPARATUS FOR TRANSMITTING MOTION FROM A SAFE AREA TO A DANGEROUS AREA
Hans Wälischmiller, Meersburg (Bodensee), Germany
Filed Apr. 29, 1963, Ser. No. 276,401
Claims priority, application Germany, Apr. 30, 1962,
W 32,171; May 25, 1962, W 32,318
9 Claims. (Cl. 74—491)

The present invention relates to apparatus for transmitting motion from a safe area to a dangerous area.

As is well known, it is necessary to carry out operations under certain circumstances in relatively dangerous areas from which the operating personnel must be protected. For example, when dealing with radioactive materials or with atmospheres having toxic gases or toxic dust particles suspended in the atmosphere, it is essential to protect the operating personnel from the dangerous areas where such radiations, gases, or the like, are located. Thus, it is conventional to provide a wall separating the dangerous area from the safe area, and in order to be able to carry out operations in the dangerous area it is necessary to provide a motion transmitting structure capable of being manipulated by personnel in the safe area to transmit motion therefrom to the dangerous area. Naturally, it is very important to seal the passage of the motion transmitting structure through the wall, and it is in the provision of a suitable sealing structure that difficulties have been encountered. While it is possible to transmit relatively light forces from a safe area to the dangerous area with belt and pulley transmissions which can be satisfactorily sealed, such transmissions are not suitable for the transmission of relatively large forces because of unavoidable stretching of the belts, cables, or the like, resulting in inaccuracy in the transmission of the motion, and as a result rotary shafts are relied upon to transmit relatively large forces between the safe and dangerous areas, and up to the present time a satisfactory solution to the problem of sealing such rotary shafts has not been found. One of the main difficulties encountered in such sealing structure is the fact that the sealing structure itself is exposed to the deteriorating effects of the dangerous area and quickly breaks down. Conventional sealing structure is made of organic materials which are highly sensitive to the destructive influences present in the dangerous area. While it is possible to use dry inorganic material for the sealing structure, the cost of such inorganic material and the precision with which it must be manufactured renders its use impractical.

It is accordingly a primary object of the present invention to provide a structure for transmitting motion from a safe area to a dangerous area while avoiding the above drawbacks. Thus, the objects of the invention include the provision of a sealing structure which while being relatively inexpensive and made of organic materials nevertheless will be protected from the destructive influences of the dangerous area.

An additional object of the present invention is to provide a structure which is capable of indicating to an operator in the safe area the condition of the sealing structure.

Also, it is an object of the present invention to provide a structure which will enable the motion transmitting elements to be adjusted.

An additional object of the present invention is to provide a structure for transmitting motion from a safe area to a dangerous area while at the same time enabling at least some of the subassemblies of this structure to be quickly and easily replaced.

With the above objects in view the invention includes, in an apparatus for transmitting motion from a safe area to a dangerous area, a wall situated between and separating said dangerous area from said safe area and having a pair of opposed faces respectively directed toward and exposed to said areas. This wall is formed with an opening passing therethrough and within this opening is located a tube in which a rotary transmission shaft is mounted. In accordance with the present invention a sealing structure for the tube and rotary shaft is situated exclusively in the region of that face of the wall which is directed toward the safe area so that in this way the sealing structure is situated relatively distant from the dangerous area to be protected therefrom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the acompanying drawings, in which:

FIG. 3 is a partly diagrammatic sectional view showing further details of sealing and motion transmitting structure of the invention.

Figure 1:
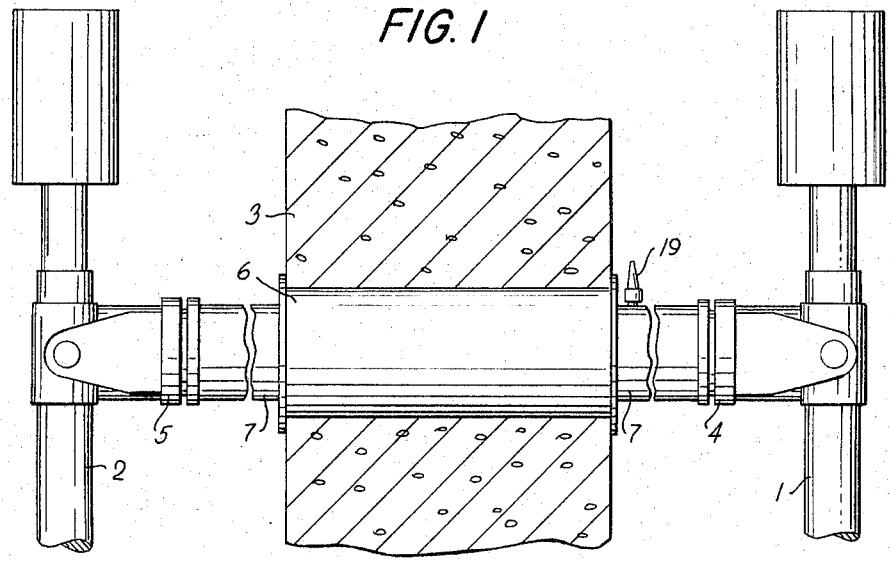
FIG. 1 is a fragmentary sectional diagrammatic illustration of a structure according to the present invention.

Referring to FIG. 1, there is shown a wall 3 which separates a dangerous area located at the left side of the wall 3, as viewed in FIG. 1, from a safe area located at the right side of the wall 3, as viewed in FIG. 1. At the safe area there is accessible to the operator a structure such as a control arm 1 capable of being manipulated by the operator, and the motion imparted to the control arm 1 by the operator will be transmitted through a suitable motion transmitting structure to a control arm 2 located in the dangerous area, and the motion transmitting structure will cause the control arm 2 to duplicate the movements of the control arm 1. The arms 1 and 2 are interconnected through a motion transmitting structure which is not illustrated in FIG. 1. As is diagrammatically shown in FIG. 1 the arms 1 and 2 are respectively linked to a pair of connector units 5 and 4 which are in turn supported by an inner tube 7, the latter passing through an outer tubular housing 6 which in turn passes through and engages the wall 3 in an opening thereof.

Figure 2:
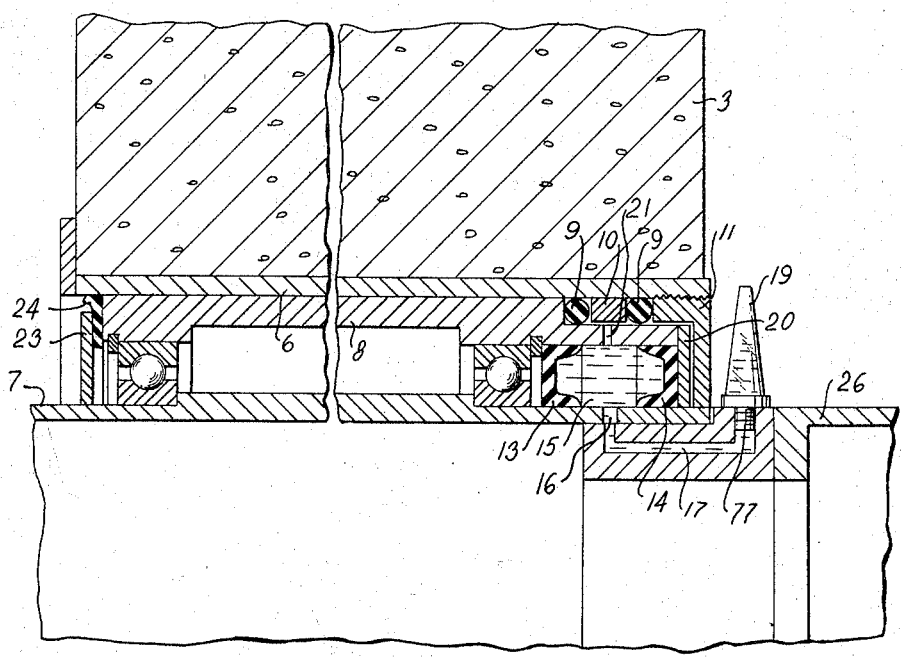
FIG. 2 is a sectional view illustrating the details of the sealing structure of FIG. 1.

As is apparent from FIG. 2, the outer tubular housing 6 is fixedly connected with the wall 3 and has an outer diameter equal to the diameter of the opening passing through the wall 3. There is no particular problem involved in sealing the exterior of the stationary tubular housing 6 with respect to the wall 3 since this tubular housing 6 is simply rigidly fixed with the wall 3 and directly engages the latter over a large area. However, there is a problem involved in sealing the rotary inner tube 7 with respect to the housing 6, and the structure for solving this problem is illustrated in detail in FIG. 2. Thus, it will be seen that an intermediate tube 8 is situated between the tubular housing 6 and the inner tube 7, the tubular structures 6–8 all being coaxial. The exterior surface of the intermediate tube 8 has a diameter substantially equal to the inner diameter of the tubular housing 6 and this intermediate tube 8 has a fairly snug fit within the tubular housing 6 so that it can be slipped into the latter. At its end portion which is directed toward the safe area, the intermediate tube 8 is stepped so as to have an outer annular shoulder directed toward the safe area and so as to have at the safe area an end portion of reduced diameter spaced from the inner surface of the tubular housing 6, and in this space there are located a pair of elastic O-rings 9 of circular cross section made of organic material, for example, and a spacer ring 10 is situated between the inner elastic ring 9 which engages the shoulder of the intermediate tube 8 and which is shown to the left of the spacer ring 10 in FIG. 2, and the outer elastic sealing ring 9 which is shown to the right of the spacer ring 10 in FIG. 2. A pressure ring 11 is threadedly carried by the housing 6, for example, and presses against the outer ring 9 to compress the latter against the spacer ring 10, axially pressing the outer ring 9 toward the spacer ring 10 and the spacer ring 10 toward the inner ring 9 so that both of the rings 9 are compressed and because of their flexible, deformable nature press against the inner surface of the tubular housing 6 and the outer surface of the intermediate tube 8 as well as against the ring 10, the shoulder of the tube 8, and the inner end of the pressure ring 11. In this way if there is any possible leakage of gas or dust from the dangerous area to the safe area through any minute fissure which might exist at the interface between the tubular housing 6 and the intermediate tube 8, such leakage is reliably prevented by the elastic rings 9, and at the same time since these rings 9 are situated in the region of that face of the wall 3 which is directed toward the safe area, these rings 9 are protected from the destructive influences of the dangerous area. It will be noted that the wall 3 is relatively thick so that by situating the sealing rings 9 in the region of the face of the wall 3 which is directed toward the safe area these rings 9 are necessarily located relatively distant from that face of the wall 3 which is directed toward and exposed to the dangerous area. It will be noted that the inner surface of the ring 10 is spaced from the outer surface of the inner tube 8 to define a relatively small annular space between tube 8 and ring 10 as well as between the pair of rings 9.

The inner tube 7 is supported for rotation in the intermediate tube 8 so that it is necessary to seal the space between the tubes 7 and 8. FIG. 2 shows a pair of ball bearings carried by the tube 8 in its interior and supporting the tube 7 for rotation relative to the tube 8. The structure for sealing the space between the tubes 7 and 8 includes a pair of elastic deformable flexible sealing rings 13 and 14 each of which is of a substantially U-shaped cross section so as to form an annular channel, and the interiors of these channels are directed toward each other, as indicated in FIG. 2. The side wall portions of each ring 13 and 14 respectively engage the inner surface of the tube 8 and the outer surface of the tube 7, and thus these latter tubes together with the rings 13 and 14 define an annular, closed spaced 15. A wall which is fixed to the interior of the tube 7 at the end thereof which is located at the safe area is formed with a passage 17 which communicates through a bore 16 of the tube 7 with the space 15, and the end of the passage 17 distant from the bore 16 communicates with an indicating means 19 which can simply take the form of a hollow transparent enclosure communicating with the passage 17 and otherwise being closed off so that the hollow interior of the transparent indicator means 19 communicates only with the passage 17. The space 15 is filled with a liquid such as oil, and the level of this oil will of course be visible at the indicator means 19. The pressure of the oil presses the side wall portions of the rings 13 and 14 against the tubes 7 and 8, and because of the deformable flexible nature of these side walls, they conform precisely to the surfaces of the tubes 7 and 8 which they engage so that the effectiveness of the seal is enhanced by the pressure of the liquid in the space 15. Furthermore, the indicating means 19 provides a reliable control for the condition of the sealing structure since even relatively small variations in the level of the liquid or bubbles which pass therethrough will be easily perceived through the transparent wall of the indicating enclosure 19, enabling steps to be taken to correct any defective conditions before injury of personnel at the safe area can occur.

The intermediate tube 8 is formed with a bore 21 providing communication between the space 15 and the above-described space defined between the rings 9 and the ring 10 and tube 8, so that this latter space is also at all times filled with oil improving also the seal between the intermediate tube 8 and the tubular housing 6 as well as providing a continuous supervision of the condition of the seal from the safe area through the indicating means 19. As will be apparent from the description below in connection with FIG. 3, the passage 17 also communicates with additional sealing structure for motion transmitting elements passing through the tube 7 so that the indicating means 19 indicates the condition of this latter sealing structure also.

Metal rings 20 and 23 are located at the ends of the intermediate tube 8 to close off these ends, and between the ring 23, which is at the dangerous area, and the adjacent end of the intermediate tube 8 there is fixed a further sealing ring 24 whose outer peripheral portion is deflected inwardly by the inner surface of the stationary tubular housing 6, so that this ring 24, while not essential, nevertheless participates to some extent in the effectiveness of the seal between the housing 6 and the intermediate tube 8.

Referring to FIG. 3, it will be seen that the inner tube 7 fixedly carries at the region of the surface of the wall 3 which is directed toward the safe area a transverse plate 25 which extends across the tube 7, and as is apparent from FIG. 3 it is this plate 25 which is formed with the passage 17 which communicates with the nipple 77 of the indicator 19 which is threaded into the end of the passage 17 distant from the bore 16. This plate 25 fixedly carries a tube 26 which forms an extension of the tube 7, and the tube 26 in turn fixedly carries a ring 27 on which a ring 28 is turnably supported. A ball or roller bearing assembly 29 serves to turnably support the ring 28 on the ring 27. The bearing assembly 29 includes a suitable cage which maintains the bearing elements separate from each other, and these bearing elements may in a known way be dropped through a suitable opening of the ring 29 into the spaces of the cage, respectively, after which this opening is closed. The tubular assembly 7, 26, 27, 28 is closed on the safe side of the wall 3 by an end plate 30 which is removably connected to the ring 28 by any suitable clips, bolts or the like, so that if required the end plate 30 can be quickly removed from the ring 28. This end plate 30 carries a plurality of ball or roller bearings 31–33 which serve to support rotary outer shafts 34–36, respectively, for rotation relative to the end plate 30.

At the dangerous side of the wall 3 the tube 7 is closed by a transverse plate 40 which is fixed to the tube 7, and this plate 40 carries a tube 41 which forms an extension of the tube 7, this tube 41 being closed by an end plate 42 which is removably connected to the tube 41 in the same way that the end plate 30 is removably connected to the ring 28. Thus the entire tubular assembly, which includes the tube 41, is closed at its safe and dangerous ends by the removable end plates 30 and 42. The end plate 42 carries a plurality of ball or roller bearings 43–45 which serve to support for rotation outer rotary shafts 46–48, respectively, which are located at the dangerous area. Manipulations imparted by the operator to the control arm 1 of FIG. 1 will in a known way result in rotation of one or more of the shafts 34–36, and the structure shown in FIG. 3 serves to transmit the rotation of these shafts respectively to the shafts 46–48 to provide duplicating movements at the control arm 2. The structure for transmitting rotation of the shafts 34–36 to the shafts 46–48 includes the rotary shafts 50–52, respectively, which are located within the inner tube 7. The motion imparted by the operator to the control arm 1 may be gripping, raising, turning, etc., motions each of which is converted into rotary motion of one or more of the shafts 34–36, and this latter motion is transmitted through the inner rotary shaft assemblies which include the shafts 50–52 to the outer rotary shafts 46–48 at the dangerous area, and the rotary motions of these shafts are converted in a known way at the control arm 2 into corresponding gripping, raising, turning, etc. motions. It will be noted that the wall 40 is formed with simple openings through which the extensions 63–65 of the hollow shafts 50–52 respectively pass. Connecting assemblies 57–59 serve to connect the extensions 63–65 to the outer shafts 46–48, respectively, in a manner constraining these outer shafts to rotate with the extensions 63–65 while freeing the shafts 46–48 for axial movement away from and back toward the extensions 63–65. Each of the connecting units 57–59 includes a sleeve formed at its right end, as viewed in FIG. 3, with a pair of diametrically opposed axial notches. These sleeves of the assemblies 57–59 are respectively fixed to the shafts 46–48, and the extensions 63–65 respectively carry cross pins which extend into the notches of the sleeves. Thus, each of the connecting means 57–59 includes a pair of connecting members respectively provided with a projection and a cutout receiving the projection so as to constrain extensions 63–65 and shafts 46–48 to rotate together while permitting unrestrained axial movement of the shafts 46–48 away from the extensions 63–65. Thus, if it should become necessary, it is possible for a suitably protected operator to enter into the dangerous area and quickly disconnect the end plate 42 from the tube 41 removing with the end plate 42 all of the structure carried thereby and leaving only the extensions 63–65 together with their cross pins within the tube 41 so that another end plate 42 with corresponding structure carried thereby can quickly and easily be connected to the tube 41 with the rotary shafts 46–48 of the new assembly automatically placed in driving engagement with the extensions 63–65, so that in this way it is possible to quickly and easily replace part of the structure which is in the dangerous area.

It will be noted that the outer shafts 34–36 at the safe area are connected through connecting assemblies 54–56, identical with the assemblies 57–59, respectively, to rotate shafts which are respectively connected through universal joints 66–68 with shafts 60–62, respectively, which in turn are connected through additional universal joints 66–68 with extensions of the shafts 50–52 which respectively pass through and are supported for rotary movement by roller or ball bearings 70–72, respectively, which are carried by the transverse plate 25 in suitable openings thereof. Because of the presence of universal joints 66–68 in the motion transmission structure it is possible for the operator to turn the end plate 30 and the ring 28 relative to the ring 27 and thus relative to the transverse plate 25 and the shafts carried thereby so that the angular orientation between the shafts 50–52 and the shafts 34–36 may be adjusted. Such adjustment of entire axially spaced portions of the shaft assemblies relative to each other is desirable under certain circumstances as where it is desired to adjust the lateral position of part of the shaft assemblies, and the universal joints 66–68 permit such lateral adjustment to be carried out while still maintaining the motion transmission from the shafts 34–36 respectively to the shafts 46–48. Any suitable releasable detent structure may be located between and connected to the rings 27 and 28 for maintaining the angular adjustment between the shafts 34–36 and the shafts 50–52.

The structure for sealing the shafts 50–52 is also located in the region of that face of the wall 3 which is directed toward and exposed to the safe area so that in this way this sealing structure is also protected from the dangerous area. This sealing structure includes a pair of sealing rings 73 and 74 surrounding part of each of the shafts 50–52 and having a structure substantially identical with the rings 13 and 14 described above, so that each pair of sealing rings 73 and 74 defines an annular space 75 situated between each pair of sealing rings and the shaft which they surround as well as the surface of the opening of the plate 25 which receives the pair of sealing rings. The plate 25 is formed with bores 76 providing communication between the several annular spaces 75, and that one of these annular spaces 75 which is closest to the passage 17 communicates therewith, as indicated in FIG. 3, and all of the spaces 75 are filled with a liquid such as oil so that the single indicating means 19 is capable of indicating the condition of the entire sealing structure.

Since the assemblies carried by the end plates 30 and 42 may be relatively heavy, a suitable lifting tool or appliance may be used in order to remove and replace either of these end plates and the structure carried thereby when the control structure 1 or the following structure 2 becomes damaged.

The elastic sealing ring assemblies 73 and 74 as well as the sealing structure shown in FIG. 2 and described above effectively prevent dangerous gases, even when at relatively high pressure such as might be encountered in the hot cell or other dangerous area, from reaching the safe area. It will be noted that the interiors of the annular channels formed by each pair of sealing rings 73 and 74 are also directed toward each other and the liquid in each space 75 presses the side wall portions of the rings 73 and 74 against the surfaces which they engage so that these flexible deformable side wall portions conform precisely to these surfaces and engage these surfaces over a large area.

When the dangerous area includes materials of high alpha-gamma-activity, the hollow interiors of the shafts 50–52 can be filled with a suitable protective material such as lead which serves to screen off the safe area from radiations from the dangerous area, and in addition one or more plates of lead or the like can be situated at one or more suitable locations within the tube 7 to screen the safe area against radiations from the dangerous area, and such screening plates can of course be formed with openings through which the rotary, motion transmitting shafts pass.

It will be understood that each of the elements described above, or two or more together, may also find a useful application in other types of motion transmitting structures differing from the types described above.

While the invention has been illustrated and described as embodied in structures for transmitting motions from safe to dangerous areas, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for transmitting motion from one area to another area, in combination, a wall situated between and separating said one area from said other area, said wall having a pair of opposed faces respectively directed toward and exposed to said areas and said wall being formed with an opening passing therethrough; a tube located in said opening; a plate carried by and extending across said tube; a plurality of rotary, motion-transmitting first shafts extending turnably through said plate; sealing means carried by said plate and surrounding said shafts to prevent a fluid from flowing from said other area to said one area, said sealing means being located exclusively at the region of that face of said wall which is directed toward said one area; a rotary plate spaced from and aligned with said first-mentioned plate and located in said one area; means carried by said tube and supporting said rotary plate for rotary movement relative to said first-mentioned plate; a plurality of rotary, motion-transmitting second shafts extending through said rotary plate; a plurality of transmissions respectively connecting said second shafts to said first shafts for transmitting rotation of said second shafts respectively to said first shafts, each of said transmissions including at least one universal joint so that the angular orientation of said first and second shafts relative to each other may be adjusted while maintaining transmission of motion therebetween.

2. In an apparatus for transmitting motion from one area to another area, in combination, a wall situated between and separating said one area from said other area and having a pair of opposed faces respectively directed toward and exposed to said areas, said wall being formed with an opening passing therethrough; a stationary tubular housing having an exterior diameter equal to the interior diameter of said opening and situated in said opening in fluid-tight engagement with said wall; an intermediate tube having an outer diameter substantially equal to the inner diameter of said tubular housing and located in the latter, said intermediate tube having a shoulder directed toward said one area and located in the region of that face of said wall which is directed toward said one area; an inner elastic ring of circular cross section engaging said shoulder and said inner surface of said housing; a spacer ring surrounding said intermediate tube and engaging said inner elastic ring; an outer elastic ring of circular cross section surrounding said intermediate tube and engaging the latter as well as said spacer ring and said tubular housing; a pressure ring carried by said tubular housing and axially pressing said outer elastic ring toward said inner elastic ring and said spacer ring toward said inner elastic ring so that said elastic rings are compressed between said tubular housing and intermediate tube to prevent any flowable medium from escaping from said other area to said one area through any space which might exist between said tubular housing and intermediate tube; an inner tube turnably mounted within said intermediate tube; and a pair of sealing rings axially spaced from each other, located between and engaging said intermediate and inner tubes, and also located in the region of said face of said wall which is directed toward said one area, said pair of sealing rings each having a substantially U-shaped cross section so as to form an annular channel and said sealing rings being situated with the interiors of said annular channels directed toward each other, and each of said sealing rings having a pair of annular side wall portions respectively engaging said intermediate and inner tubes.

3. In an apparatus as recited in claim 2, said sealing rings being elastic and flexible and the space between said sealing rings being filled with a liquid which presses such side wall portions of said sealing rings against said intermediate and inner tubes.

4. In an apparatus as recited in claim 3, indicating means located at said one area and communicating with the liquid which is in said space between said sealing rings for indicating the condition of said liquid.

5. In an apparatus as recited in claim 4, said intermediate tube being formed with an opening providing communication between said space between said sealing rings and a space defined between said elastic rings of circular cross section and said spacer ring and intermediate tube so that the liquid is also located in said latter space.

6. In an apparatus for transmitting motion from one area to another area, in combination, a wall situated between and separating said one area from said other area, said wall having opposed faces respectively directed toward and exposed to said areas and said wall being formed with an opening passing therethrough; a tube located in said opening; a plate carried by and extending across said tube in the region of that face of said wall which is directed toward said one area; a plurality of rotary motion-transmitting shafts respectively extending through said plate; a pair of elastic sealing rings surrounding each shaft and carried by said plate and forming the only structure which seals the shafts, so that said sealing rings are situated only in the region of said face of said wall which is directed toward said one area at a location relatively distant from said other area, each sealing ring having a substantially U-shaped cross section so as to form an annular channel and the pair of sealing rings which surrounds each shaft having their interiors directed toward each other and the space between each pair of sealing rings which surrounds each shaft being filled with a liquid, said plate being formed with passages providing communication between the spaces between said pairs of sealing rings so that all of said spaces communicate with each other; and indicating means at said one area communicating with said liquid to indicate the condition thereof.

7. In an apparatus for transmitting motion from a safe area to a radioactive area, in combination, a wall situated between and separating said safe area from said radioactive area, said wall having opposed faces respectively directed toward and exposed to said areas and said wall being formed with an opening passing therethrough; a tube located in said opening; a plate carried by and extending across said tube in the region of that face of said wall which is directed toward said safe area; a plurality of rotary motion-transmitting shafts respectively extending through said plate; a pair of elastic sealing rings surrounding each shaft and carried by said plate and forming the only structure which seals the shafts, so that said sealing rings are situated only in the region of said face of said wall which is directed toward said safe area at a location relatively distant from said radioactive area, and said shafts being hollow at least at portions thereof which are located in the opening of said wall; and shielding material shielding against radioactive radiation and filling said hollow portions of said shafts to screen said safe area against radioactive radiation from said radioactive area in direction of said shafts.

8. In an apparatus as recited in claim 1, pairs of connecting members respectively connected to said first and second rotary shafts, one of said connecting members being formed with a cutout and the other of said connecting members having a projection located in said cutout, and said cutout and projection cooperating to constrain said shafts for rotation together while freeing said second shaft for axial movement away from said first shaft when said end wall is removed from said tubular assembly so that said end wall and second shaft can be quickly and easily replaced by another end wall and second shaft while establishing the connection between said shafts.

9. In an apparatus for transmitting motion from one area to another area, in combination, a wall situated between and separating said one area from said other area and having a pair of opposed faces respectively directed toward and exposed to said areas, said wall being formed with an opening passing therethrough; a stationary tubular housing having an exterior diameter equal to the interior diameter of said opening and situated in said opening in fluid-tight engagement with said wall; an intermediate tube having an outer diameter substantially equal to the inner diameter of said tubular housing and located in the latter, said intermediate tube having a shoulder directed toward said one area and located in the region of that face of said wall which is directed toward said one area; an inner elastic ring of circular cross section engaging said shoulder and said inner surface of said housing; a spacer ring surrounding said intermediate tube and engaging said inner elastic ring; an outer elastic ring of circular cross section surrounding said intermediate tube and engaging the latter as well as said spacer ring and said tubular housing; a pressure ring carried by said tubular housing and axially pressing said outer elastic ring toward said spacer ring and said spacer ring toward said inner elastic ring so that said elastic rings are compressed between said tubular housing and intermediate tube, the space between said inner and said outer elastic rings being filled with a fluid of a pressure exceeding the pressure in said other area to prevent any flowable medium from escaping from said other area to said one area through any space which might exist between said tubular housing and intermediate tube.

References Cited by the Examiner

UNITED STATES PATENTS

| | | | |
|---|---|---|---|
| 1,289,375 | 12/1918 | Bright | 64—4 |
| 2,247,505 | 7/1941 | Kohler | 277—74 |
| 2,818,283 | 12/1957 | Hutterer | 277—58 X |
| 2,867,997 | 1/1959 | Lake | 64—1 |
| 2,877,029 | 3/1959 | Peguet et al. | 277—84 X |
| 2,948,554 | 8/1960 | Mahand | 277—71 X |
| 2,960,341 | 11/1960 | Emrick | 64—31 X |
| 3,101,387 | 8/1963 | Mehran | 74—504 X |
| 3,116,066 | 12/1963 | Koppins | 277—81 X |
| 3,128,887 | 4/1964 | Guennec et al. | 214—1 |

FOREIGN PATENTS

| | | |
|---|---|---|
| 782,089 | 8/1957 | Great Britain. |
| 862,174 | 3/1961 | Great Britain. |
| 862,553 | 3/1961 | Great Britain. |

OTHER REFERENCES

"The Use of Lead Shot for Protection From Gamma Radiation," by Nightengale, British Journal of Radiology, vol. XXIV, No. 286, October 1951, pp. 568–71.

FRED C. MATTERN JR., *Primary Examiner.*

BROUGHTON G. DURHAM, *Examiner.*

D. H. THIEL, *Assistant Examiner.*